US 6,575,770 B2

(12) United States Patent
Birch et al.

(10) Patent No.: US 6,575,770 B2
(45) Date of Patent: Jun. 10, 2003

(54) OPTOELECTRONIC MODULE APPARATUS AND METHOD OF ASSEMBLY

(75) Inventors: Kevin Michael Birch, Stowmarket (GB); Peter Charles Gibson, Hadleigh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/920,597

(22) Filed: Aug. 1, 2001

(65) Prior Publication Data

US 2003/0027440 A1 Feb. 6, 2003

(51) Int. Cl.[7] ............................................... G02B 6/43
(52) U.S. Cl. ........................................ 439/76.1; 439/79
(58) Field of Search ........................... 439/79, 80, 76.1; 385/92

(56) References Cited

U.S. PATENT DOCUMENTS

| 6,213,651 | B1 | * | 4/2001 | Jiang et al. | .................. | 385/92 |
| 6,369,924 | B1 | * | 4/2002 | Scharf et al. | ............... | 339/152 |
| 6,381,283 | B1 | * | 4/2002 | Bhardwaj et al. | ........... | 375/257 |

* cited by examiner

Primary Examiner—Neil Abrams

(57) ABSTRACT

An optoelectronic module including a skeleton structure, a platform portion, and a vertical portion is provided. The skeleton structure has a socket portion and the vertical portion extends from the socket portion to a transverse back plate. The platform portion has a first array of recesses arranged to receive a plurality of pins extending from a first circuit board disposed on the optoelectronic module.

12 Claims, 3 Drawing Sheets

OPTOELECTRONIC MODULE APPARATUS AND METHOD OF ASSEMBLY

FIELD OF THE INVENTION

The present invention relates to a module apparatus of the type used to receive an optoelectronic device package and a circuit board for coupling to the optoelectronic device package. The present invention also relates to a method of assembling the module apparatus.

BACKGROUND OF THE INVENTION

An optical transceiver module is package comprising a transmission connector for coupling a first optical fibre to an optical transmitter sub-assembly, a reception connector for coupling a second optical fibre to an optical receiver sub-assembly, a transmitter Printed Circuit Board (PCB) coupled to the optical transmitter sub-assembly, and a receiver PCB coupled to the optical receiver sub-assembly. The optical transceiver module is typically manufactured by an optoelectronic equipment manufacturer for a customer, the customer being desirous to couple the optical transceiver module to a custom-built PCB.

Due to the different physical configurations of different optical transceiver designs of various optoelectronic equipment manufacturers, a number of these optoelectronic equipment manufacturers agreed to conform to certain common configuration parameters (known as the small form factor multisource agreement for optical transceivers). In particular, spacings between pins of the transceiver module relating to the optical receiver sub-assembly and a receiver optical reference plane of the optical receiver sub-assembly, and between pins of the transceiver module relating to the optical transmitter sub-assembly and a transmitter optical reference plane of the optical transmitter sub-assembly have been agreed. Consequently, the customer is free to design the custom PCB without the restriction of having to source optical transceiver equipment from a single optoelectronic equipment manufacturer.

The agreed common configuration parameters relating to the optical transceiver module are such that the above-mentioned spacings are 1.33 mm each. Such distances are very small and are very difficult to attain the spacings between the pins and the respective optical reference planes with direct connections between the receiver PCB and the optical receiver sub-assembly and the transmitter PCB and the transmitter sub-assembly.

In order to remove the fixed relationship between the pins of the receiver PCB and the optical receiver sub-assembly and the pins of the transmitter PCB and the optical transmitter sub-assembly, it is known to couple one end of a first flex circuit to the receiver PCB and the other end of the first flex circuit to the optical receiver sub-assembly. Similarly, one end of a second flex circuit is coupled to the transmitter PCB and the other end of the second flex circuit is coupled to the optical transmitter sub-assembly. The use of the first and second flex circuits make configurations of the transmitter PCB, the receiver PCB, the optical transmitter sub-assembly and optical receiver sub-assembly within the optical transceiver module more versatile with respect to other known optical transceiver module designs requiring direct connection between the receiver PCB and the optical receiver sub-assembly and between the transmitter PCB and the optical transmitter sub-assembly.

However, each of the first and second flex circuits require twice as many solder connections than a direct connection. Also, the first and second flex circuits constitute additional components. The above disadvantages impact upon yield, cost and reliability of the optical transceiver module.

SUMMARY OF THE INVENTION

According to the present invention, there is provided a module apparatus for coupling to an optical fibre and a circuit board, said apparatus comprising: a circuit board card defining a planar surface and an edge, and a base for location substantially parallel to a circuit board, said base being arranged to receive an optoelectronic sub-assembly and a circuit board card, said optoelectronic sub-assembly including an optoelectronic device; and said optoelectronic sub-assembly coupled to said circuit board card; wherein: said circuit board card comprises a plurality of pins attached to said edge of said circuit board card and extending away from said edge substantially parallel to said surface of said circuit board card, and said base comprises a plurality of recesses or apertures therein permitting passage of said plurality of pins through said base so that said plurality of pins act as a plurality of pins of said module for coupling to said circuit board and enable said circuit board card to be disposed substantially perpendicular to said base.

Preferably, the apparatus further comprises an optical centreline associated with said optoelectronic sub-assembly and a centreline associated with said pins, wherein said optoelectronic sub-assembly is disposed relative to said circuit board card so that a shortest distance between said centreline of said pins and said optical centreline is maintained at a predetermined distance. More preferably, said shortest distance is substantially 1.33 mm.

Preferably, said plurality of recesses or apertures are disposed so as to align said circuit board card relative to said optical sub-assembly when said plurality of pins pass through said apertures or recesses.

In a preferred embodiment of the invention, an optoelectronic module apparatus is provided for coupling to an optical fibre and a circuit board, said apparatus comprising: an optoelectronic sub-assembly having a plurality of terminals, said optoelectronic sub-assembly including an optoelectronic device, a circuit board card defining a substantially rectangular planar surface having a longitudinal edge, and a skeleton comprising a base for location substantially parallel to a circuit board, said skeleton being arranged to receive said optoelectronic sub-assembly and said circuit board card, wherein said plurality of terminals of said optoelectronic sub-assembly are directly coupled to said circuit board card; said circuit board card comprises a plurality of pins attached along said longitudinal edge of said circuit board card and extending away from said longitudinal edge substantially parallel to said surface of said circuit board card, and said base comprises a plurality of aligned recesses therein permitting said plurality of pins to pass through said floor so that said plurality of pins act as a plurality of pins of said optoelectronic module for coupling said optoelectronic module to said circuit board, and to enable said circuit board card to be disposed substantially perpendicular to said base of said skeleton.

According to the present invention, there is also provided a method of assembling a module apparatus comprising a circuit board card defining a planar surface and an edge, and a base for location substantially parallel to a circuit board, said base being arranged to receive an optoelectronic sub-assembly and a circuit board card, said optoelectronic sub-assembly including an optoelectronic device, and said optoelectronic sub-assembly being coupled to said circuit board card, said circuit board card comprising a plurality of pins attached to said edge of said circuit board card and extending away from said edge substantially parallel to said surface of said circuit board card, and said base comprises a plurality of recesses or apertures therein, the method comprising the steps of: installing said optoelectronic sub-assembly onto said base; installing said circuit board card by passing said plurality of pins into said plurality of recesses or apertures so that said plurality of pins are disposed substantially perpendicular to said base; coupling said optoelectronic sub-assembly to said circuit board card.

Preferably, the method further comprises the step of: directly coupling said optoelectronic sub-assembly to said circuit board card by soldering said optoelectronic sub-assembly to said circuit board card.

The method may further comprise the step of: attaching said plurality of pins to the edge of said circuit board card using a lead frame.

Preferably, said plurality of pins is attached to said circuit board card using a lead frame.

In another preferred embodiment of the invention, there is provided a method of assembling an optoelectronic module apparatus comprising an optoelectronic sub-assembly having a plurality of terminals, said optoelectronic sub-assembly including an optoelectronic device, a circuit board card defining a substantially rectangular planar surface and a longitudinal edge, and a skeleton comprising a base for location substantially parallel to a circuit board, said skeleton being arranged to receive said optoelectronic sub-assembly and said circuit board card, said circuit board card comprising a plurality of pins attached along said longitudinal edge of said circuit board card and extending away from said longitudinal edge substantially parallel to said surface of said circuit board card, and said base comprises a plurality of aligned recesses therein, the method comprising the steps of: coupling said optoelectronic sub-assembly to said skeleton; placing said circuit board card onto said base so that said plurality of pins pass into said plurality of recesses; coupling said plurality of terminals of said optoelectronic sub-assembly to said circuit board card.

It is thus possible to provide an optical transceiver module that has fewer parts and hence is more reliable and economical (in terms of components) than prior optical transceiver modules. The method of assembling the optical module also results in an optical module that needs to be subject to fewer manufacturing steps and so is quicker and cheaper to manufacture.

BRIEF DESCRIPTION OF THE DRAWINGS

At least one embodiment of the invention will now be described, by way of example only, with reference to the accompanying drawings, in which.

DETAILED DESCRIPTION OF AT LEAST ONE PREFERRED EMBODIMENT

Figure 1:
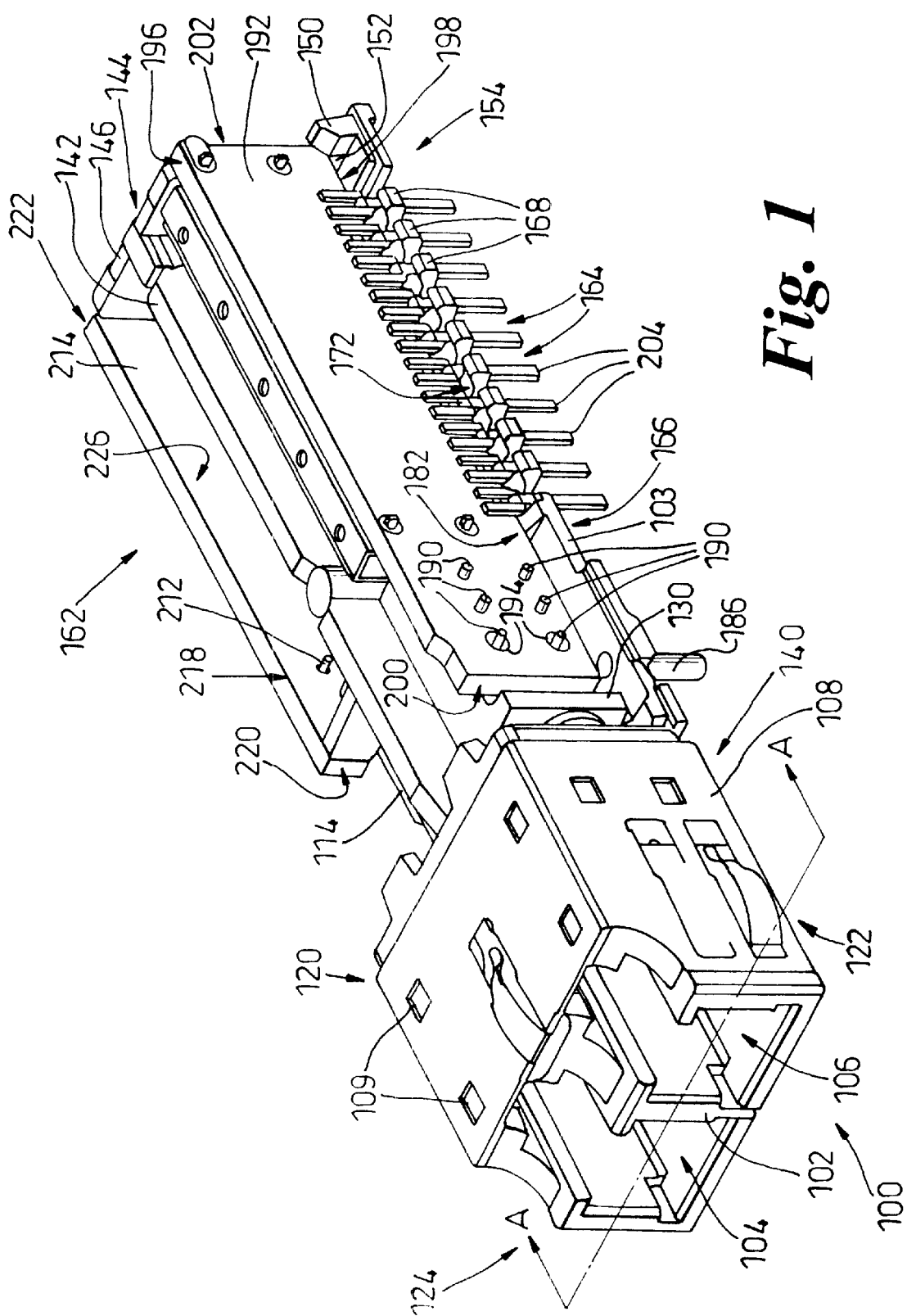
FIG. 1 is a schematic diagram of a perspective view of an optoelectronic transceiver module constituting an embodiment of the present invention.

Referring to FIG. 1, an optical transceiver module comprises a skeleton structure 100 and an outer protective housing (not shown). The skeleton structure 100 comprises a socket portion 102 and a platform portion 103. The socket portion 102 comprises a transmission socket 104 and a reception socket 106, each shaped to receive a complementarily formed transmission plug (not shown) and a complementarily formed reception plug (not shown), respectively. The transmission plug can be coupled to an outgoing optical fibre (not shown) used to carry optical signals transmitted from the optical transceiver module. Similarly, the reception plug can be coupled to an incoming optical fibre (not shown) used to carry optical signals for receipt by the optical transceiver module.

A sleeve-like ground cap 108 surrounds the socket portion 102 and comprises engagement tabs 109 depending towards the socket portion for engagement with complementary depressions (not shown) formed on an outer surface (not shown) of the socket portion 102. The ground cap 108 is shaped to be received by a front panel aperture (not shown) of a customer's apparatus that uses the optical transceiver module. The front panel aperture is typically maintained at ground potential and so, by virtue with the ground cap's connection with other parts, maintains the ground cap 108, the interior of the transmission socket 104, the interior of the reception socket 106 and the transmitter and receiver sub-assemblies 114, 130 at ground potential.

The transmission socket 104 has a first rear wall 110 (FIG. 2) comprising a first circular aperture 112 through which a coupling portion 113 of a transmitter optical sub-assembly 114 passes so that the transmitter sub-assembly 114 is located, in-part, within the transmission socket 104. The transmitter sub-assembly 114 also passes through a circular aperture in a first tab 117 of a first flexible coupling plate 118. A circumferential shoulder 116 of the transmitter sub-assembly 114 abuts, and is welded to, the first tab 117. The first tab 117 is joined to a second tab (not shown) and a third tab (not shown) by a first central rectangular portion 119. The first central portion 119 lies against a first side surface 124 of the socket portion 102. The first tab 117 of the first coupling plate 118 wraps around the first rear wall 110 and lies against the first rear wall 110 so that the circular aperture in the first tab 117 is aligned with the first circular aperture 112. The second and third tabs each comprise respective engagement tabs (not shown), the second and third tabs each wrapping around the socket portion 102 so that the second tab lies against, and the respective engagement tab co-operates with, an upper surface 120 (FIG. 1) of the socket portion 102, and the third tab lies against, and the respective engagement tab co-operates with, a lower surface 122 of the socket portion 102.

The reception socket 106 has a second rear wall 126 (FIG. 2) comprising a second circular aperture 128 through which a coupling portion 129 of a receiver optical sub-assembly 130 passes so that the receiver sub-assembly is located, in-part, within the reception socket 106. The reception sub-assembly 130 also passes through a circular aperture in a first tab 134 of a second flexible coupling plate 136. A circumferential shoulder 132 of the receiver optical sub-assembly 130 abuts, and is welded to, the first tab 134. The first tab 134 is joined to a second tab (not shown) and a third tab (not shown) by a second central rectangular portion 138. The second central portion 138 lies against a second side surface 140 of the socket portion 102. The first tab 134 of the second coupling plate 136 wraps around the second rear wall 126 and lies against the second rear wall 126 so that the circular aperture in the first tab 134 is aligned with the second circular aperture 128. The second and third tabs of the second flexible coupling plate 136 each comprise respective engagement tabs (not shown), the second and third tabs each wrapping around the socket portion 102, so that the second tab lies against, and the respective engagement tab co-operates with, the upper surface 120 (FIG. 1) of the socket portion 102, and the third tab lies against, and the respective engagement tab co-operates with, the lower surface 122 of the socket portion 102.

Referring to FIG. 1, the platform portion 103 is integrally formed with the socket portion 102 and comprises a vertical partition 142 extending from, and integrally formed with, the socket portion 102 to a transverse back plate 144 located at a distal end 144 of the platform portion 103 with respect to the socket portion 102. The vertical partition 142 is also integrally formed with the transverse back plate 146, the transverse back plate 146 being integrally formed with the platform portion 103. The vertical partition 142 provides the skeleton structure 100 with rigidity and strength.

At the distal end 144 of the platform portion 103, a first circuit board location slot 148 (FIG. 2) is defined by the transverse back plate 146, a first lug 150 extending away from the plane of the platform portion 103, and a first raised central portion 152 bridging the transverse back plate 146 and the first lug 150; the first raised control portion 152 is lower than the transverse back plate 146 and the first lug 150. The first circuit board location slot 148 is located on a first side 154 of the platform portion 103 and is integrally formed with the platform portion 103. Similarly, a second circuit board location slot 156 is located at the distal end 144 and defined by the transverse back plate 146, a second lug 158 extending away from the plane of the platform portion 103, and second raised central portion 160 bridging the transverse back plate 146 and the second lug 158; the second raised portion 160 is lower than the transverse back plate 146 and the second lug 158. The second circuit board location slot 156 is located on a second side 162 of the platform portion 103 and is integrally formed with the platform portion 103.

With reference to the first side 154 of the platform portion 103, a first array of recesses 164 is disposed in a first side edge 166 of the platform portion 103 adjacent the first circuit board location slot 148. The recesses of the first array of recesses 164 are separated by a plurality of first fingers 168 (FIG. 1). The plurality of first fingers 168 are each formed so as to be tine-like having an upper surface 172 that slopes away from the plane of the platform portion 103, i.e. the plurality of first fingers 168 thicken vertically.

Turning to the second side 162 of the platform portion 103, a second array of recesses 174 (FIG. 2) is disposed in a second side edge 175 of the platform portion 103 adjacent the second circuit board location slot 156. The recesses of the second array of recesses 174 are separated by a plurality of second fingers 176. The plurality of second fingers 176 are each formed so as to be tine-like having an upper surface 180 that slopes away from the plane of the platform portion 103, i.e. the plurality of second fingers 176 thicken vertically.

On the first side 154 of the platform portion 103, a first shallow wall 182 is integrally formed with the platform portion 103 adjacent the first array of recesses 164 and between the first array of recesses 164 and the socket portion 102. Similarly, on the second side 162 of the platform portion 103, a second shallow wall 184 is integrally formed with the platform portion 103 adjacent the second array of recesses 174 and between the second array of recesses 174 and the socket portion 102.

A first metallic leg 186 depends from the first side 154 of the platform portion 103 and a second metallic leg 188 depends from the second side 162 of the platform portion 103.

Referring to FIG. 1, the receiver optical sub-assembly 130 comprises, in this example, six connecting leads 190 for soldering to a receiver circuit board card 192 to provide connections to a photodiode (not shown) contained by the receiver optical sub-assembly 130. The receiver circuit board card 192 comprises six spaced apertures 194 through which the six connecting leads 190 pass, respectively. The six spaced apertures 194 through which the six connecting leads 190 pass are ultimately each filled with solder to hold the six connecting leads 190 in place with respect to the six spaced apertures 194, and hence to couple the receiver optical sub-assembly 130 to the receiver circuit board card 192.

The receiver circuit board card 192 is rectangular in shape having an upper longitudinal edge 196, a lower longitudinal edge 198, a front edge 200 and a rear edge 202. A first array of circuit board leads 204, or pins, are coupled to the lower longitudinal edge 198 of the receiver circuit board card 192. Tracks (not shown) on the receiver circuit board card 192 run between components and/or integrated circuits populating the receiver circuit board card 192 and the first array of circuit board leads 204 to permit electrical signals to travel on and off of the receiver circuit board card 192. In this example, the first array of circuit board leads 204 is attached to the receiver circuit board card 192 using a lead frame having an inter-lead pitch of 70 thousandths of an inch (1.778 mm). The first array of circuit board leads 204 is substantially co-planar with the receiver circuit board card 192 and depend from the lower edge 198 of the receiver circuit board card 192. Each lead of the first array of circuit board leads 204 passes through a respective recess of the first array of recesses 164 so that the first array of circuit board leads 204 is interdigitated with the plurality of first fingers 168.

A corner of the rear edge 202 and the lower longitudinal edge 198 sits in the first circuit board location slot 148 and a portion of the lower longitudinal edge 198 rests on, and is supported by, the first shallow wall 182. A vertical strip of an innermost surface 206 of the receiver circuit board card 192 opposite, and parallel with, the vertical partition 142 abuts an end of the transverse back plate 146 near the rear edge 202 of the receiver circuit board card 192.

Figure 3:
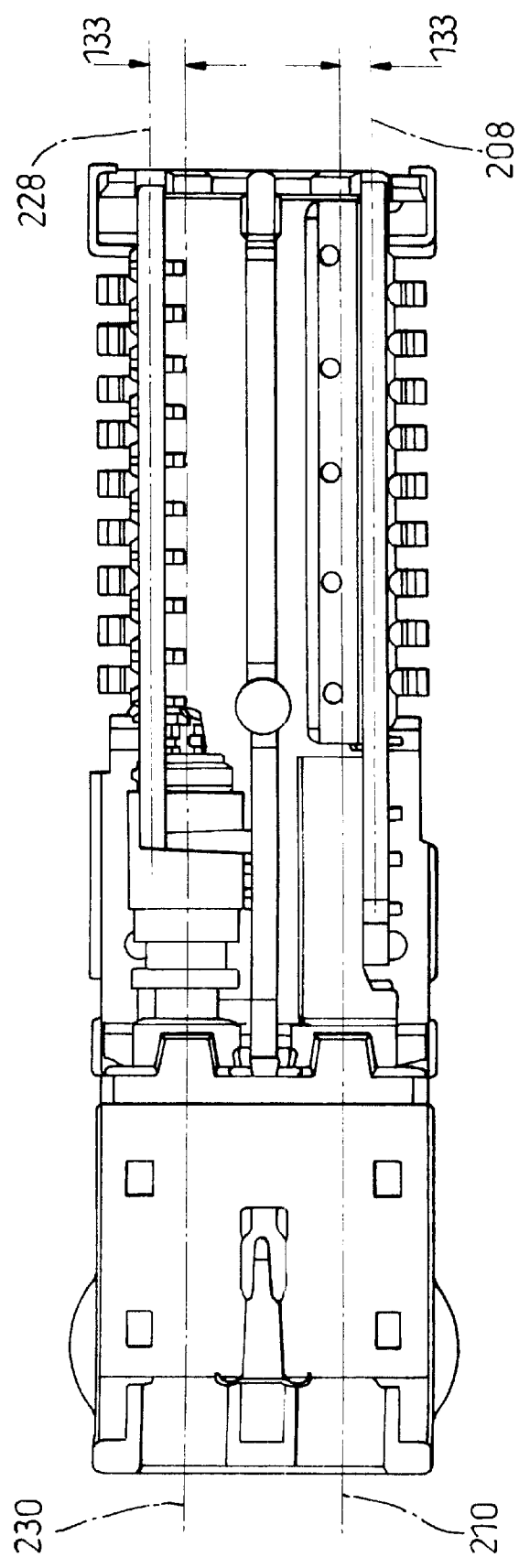
FIG. 3 is a plan view of the module of FIG. 1.

The first circuit board location slot 148 and the coupling of the receiver circuit board card 192 to the receiver optical sub-assembly 130 ensures that a first circuit board centreline 208 (FIG. 3), corresponding to a longitudinal linear disposition of the first array of circuit board leads 204, is spaced (shortest distance) a first predetermined distance, in this example 1.33 mm, from a first optical centreline 210 associated with the receiver optical sub-assembly 130.

Figure 2:
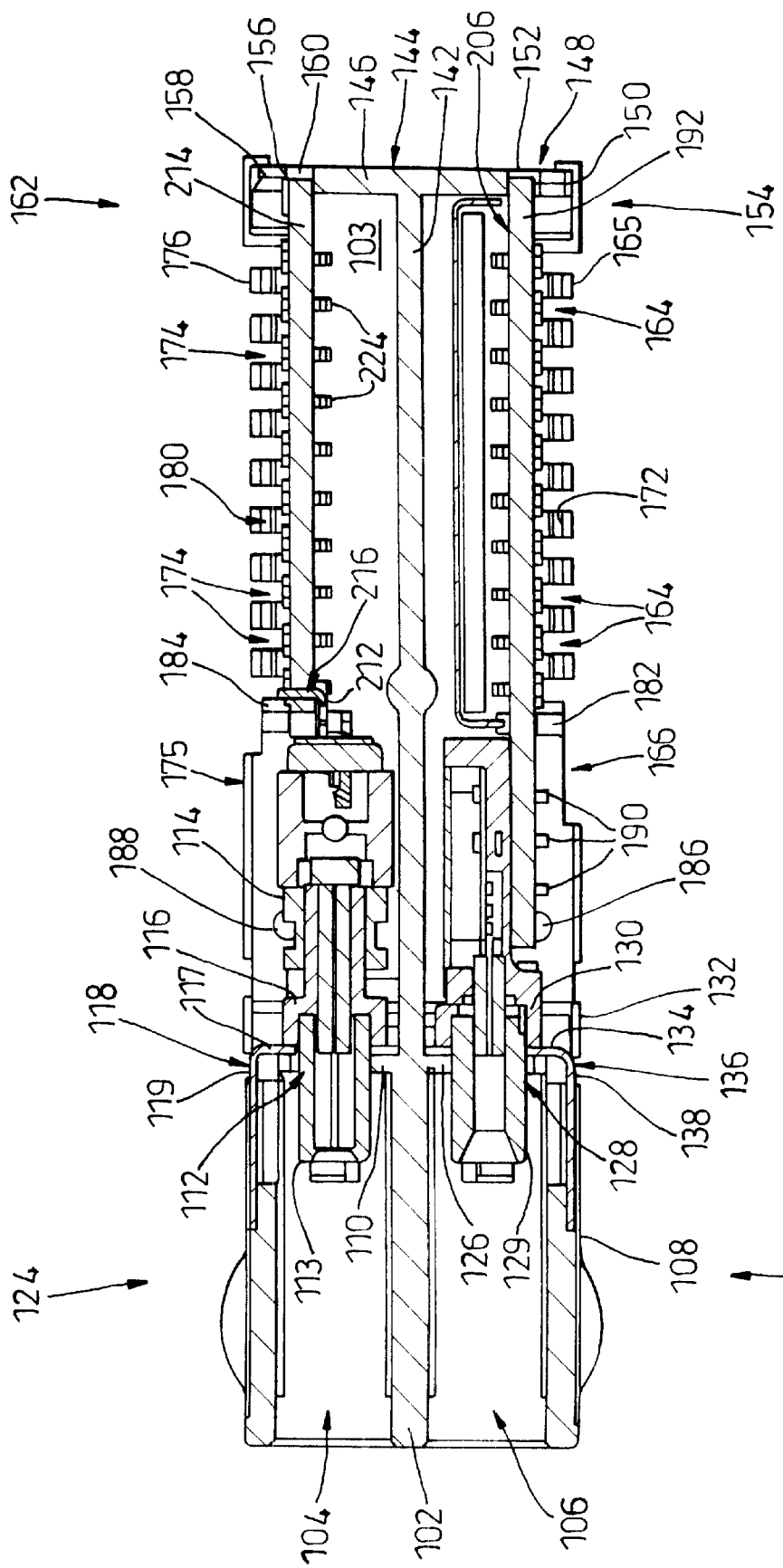
FIG. 2 is a cross-section view, along line A—A, of the module of FIG. 1.

Referring to FIG. 2, the transmitter optical sub-assembly 114 comprises, in this example, three connecting leads 212 for soldering to a transmitter circuit board card 214. The transmitter circuit board card 214 comprises three spaced apertures 216 through which the three connecting leads 212 pass, respectively. The three spaced apertures 216 through which the three connecting leads 212 pass are ultimately each filled with solder to hold the three connecting leads 212 in place with respect to the three spaced apertures 216, and hence to couple the transmitter optical sub-assembly 114 to the transmitter circuit board card 214.

The transmitter circuit board card 214 is rectangular in shape having an upper longitudinal edge 218, a lower longitudinal edge (not shown), a front edge 220 and a rear edge 222. A second array of circuit board leads 224 are coupled to the lower longitudinal edge of the transmitter circuit board card 214. Tracks (not shown) on the transmitter circuit board card 214 run between components and/or integrated circuits populating the transmitter circuit board card 214 and the second array of circuit board leads 224 to permit electrical signals to travel on and off of the transmitter circuit board card 214. In this example, the second array of circuit board leads 224 is attached to the transmitter circuit board card 214 using a lead frame having an inter-lead pitch of 70 thousandths of an inch (1.778 mm). The second array of circuit board leads 224 is substantially co-planar with the transmitter circuit board card 214 and depend from the lower edge of the transmitter circuit board card 214. Each lead of the second array of circuit board leads 224 passes through a respective recess of the second array of recesses 174 so that the second array of circuit board leads 224 is interdigitated with the plurality of second fingers 176.

A corner of the rear edge 222 and the lower longitudinal edge of the transmitter circuit board card 214 sits in the second circuit board location slot 156 and a portion of the lower longitudinal edge of the transmitter circuit board card 214 rests on, and is supported by, the second shallow wall 184. A vertical strip of innermost surface 226 of the transmitter circuit board card 214 opposite, and parallel with, the vertical partition 142 abuts an end of the transverse back plate 146 near the rear edge 222 of the transmitter circuit board card 214.

The second circuit board location slot 156 and the coupling of the transmitter circuit board card 214 to the transmitter optical sub-assembly 114 ensures that a second circuit board centreline 228 (FIG. 3), corresponding to a longitudinal linear disposition of the second array of circuit board leads 224, is spaced (shortest distance) a second predetermined distance, in this example 1.33 mm, from a second optical centreline 230 associated with the transmitter optical sub-assembly 114.

During normal assembly, the circumferential shoulder 116 of the transmitter optical subassembly 114 and the circumferential shoulder 132 of the receiver optical sub-assembly 130 are welded to the first flexible coupling plate 118 and the second flexible coupling plate 136 respectively. The transmitter optical sub-assembly 114 is inserted into the first circular aperture 112 and the first central portion 119, the second tab and the third tab of the first flexible coupling plate 118 are wrapped around the socket portion 102. Similarly, the receiver optical sub-assembly 130 is inserted into the second circular aperture 128 and the second central portion 138, the second tab and the third tab of the second flexible coupling plate 136 are wrapped around the socket portion 102.

The receiver and transmitter circuit board cards 192, 214 are assembled in accordance with any circuit board manufacturing technique known in the art, the components and/or integrated circuits and track topologies for the receiver and transmitter circuit board cards 192, 214 being such that the receiver and transmitter circuit board cards 192, 214 perform functions of their respective designs. Board leads, or pins, are attached to pads formed at the lower edge 198 of the receiver circuit board card 192 and the lower edge of transmitter circuit board card 214. The board leads are attached to the pads using lead frames and the leads, once push fitted, are soldered to the pads. The receiver circuit board card 192 is then inserted sideways onto the platform portion 103 towards the vertical partition 142 so that the board leads attached to the receiver circuit board card 192 are individually received by respective recesses of the first array of recesses 164. The receiver circuit board card 192 is inserted and manipulated until the corner of the rear edge 202 and the lower longitudinal edge 198 sits in the first circuit board location slot 148 and the six connecting leads 190 pass through the six spaced apertures 194, respectively, and the innermost surface 206 of the receiver circuit board card 192 abuts the receiver optical sub-assembly 130 and the transverse back plate 146. The six connecting leads 190 are then respectively soldered in the six spaced apertures 194.

With respect to the transmitter optical sub-assembly 114, the three connecting leads 212 are bent by a lead forming tool prior to coupling of the transmitter optical sub-assembly 114 to the socket portion 102 so that the three connecting leads 212 pass through the three spaced apertures 216 when the transmitter circuit board card 214 is in place in the platform portion 103. In this respect, the transmitter circuit board card 214 is inserted sideways onto the platform portion 103 towards the vertical partition 142 so that the board leads attached to the transmitter circuit board card 214 are individually received by respective recesses of the second array of recesses 174. The transmitter circuit board card 214 is inserted and manipulated until the corner of the rear edge 222 and the lower longitudinal edge of the transmitter circuit board card 214 sits in the second circuit board location slot 156 and the three connecting leads 212 pass through the three spaced apertures 216, respectively, and the innermost surface 226 of the transmitter circuit board card 214 abuts the end of the transverse back plate 146. The three connecting leads 212 are then each soldered in their respective aperture of the three spaced apertures 216.

Finally, the ground cap 108 is attached to the socket portion 102 and the outer protective housing (not shown) is attached to the platform portion 103 in order to protect the apparatus on the platform portion 103 and provide shielding from Electromagnetic Interference (EMI).

The optical transceiver module can then be soldered to a printed circuit board of an optical communications system by the leads of the transmitter and receiver circuit board cards 192, 214.

What is claimed is:

1. An optoelectronic module comprising:
   a skeleton structure having a socket portion;
   a platform portion; and
   a vertical portion, said vertical portion extending from said socket portion to a transverse back plate, wherein said platform portion comprises a first array of recesses arranged to receive a plurality of pins extending from a first circuit board disposed on the optoelectronic module.

2. The optoelectronic module as claim 1, wherein said platform portion, said vertical portion, and said transverse back plate are integrally formed on said skeleton structure.

3. The optoelectronic module as in claim 2, wherein said first circuit board abuts against said transverse back plate.

4. The optoelectronic module as in claim 3, wherein said first circuit board has disposed thereon a first optoelectronic sub-assembly.

5. The optoelectronic module as in claim 4, further comprising an optical centerline associated with said first optoelectronic sub-assembly and a centerline associated with said pins, wherein said first optoelectronic sub-assembly is disposed relative to said first circuit board so that said centerline of said pins and said optical centerline are maintained at a predetermined distance from one another.

6. The optoelectronic module as in claim 5, wherein said predetermined distance is about 1.33 mm.

7. The optoelectronic module as in claim 6, wherein said first array of recesses is disposed so as to align said first circuit board relative to said first optical sub-assembly when said plurality of pins pass through said first array of recesses.

8. The optoelectronic module as in claim 2, wherein said platform portion further comprises a second array of recesses arranged to receive a plurality of pins extending from a second circuit board disposed on the optoelectronic module.

9. The optoelectronic module as in claim 8, wherein said second circuit board abuts against said transverse back plate.

10. The optoelectronic module as in claim 9, wherein said second circuit board has disposed thereon a second optoelectronic sub-assembly.

11. A method of assembling an optoelectronic module comprising a skeleton structure having a socket portion, a platform portion, and a vertical portion, said vertical portion extending from said socket portion to a transverse back plate, wherein said platform portion comprises a first array of recesses arranged to receive a plurality of pins extending from a first circuit board disposed on the optoelectronic module, the method comprising:

attaching a first optoelectronic sub-assembly to said first circuit board; and inserting from a substantially horizontal direction said first circuit board onto said platform portion by passing said plurality of pins into said first array of recesses so that said plurality of pins are disposed substantially perpendicular to said platform portion and said first circuit board abuts said transverse back plate.

12. The method as in claim 11, wherein said platform portion further comprises a second array of recesses arranged to receive a plurality of pins extending from a second circuit board disposed on said module, said method further comprising:

attaching a second optoelectronic sub-assembly to said second circuit board; and inserting from a substantially horizontal direction said second circuit board onto said platform portion by passing said plurality of pins into said second array of recesses so that said plurality of pins are disposed substantially perpendicular to said platform portion and said second circuit board abuts said transverse back plate.

* * * * *